(12) United States Patent
Bradbrook

(10) Patent No.: US 11,448,087 B2
(45) Date of Patent: Sep. 20, 2022

(54) GAS TURBINE ENGINE

(71) Applicant: ROLLS-ROYCE plc, London (GB)

(72) Inventor: Stephen J. Bradbrook, Clevedon (GB)

(73) Assignee: Rolls-Royce PLC, London (GB)

( * ) Notice: Subject to any disclaimer, the term of this patent is extended or adjusted under 35 U.S.C. 154(b) by 139 days.

(21) Appl. No.: 17/004,601

(22) Filed: Aug. 27, 2020

(65) Prior Publication Data
US 2021/0079807 A1  Mar. 18, 2021

(30) Foreign Application Priority Data
Sep. 17, 2019 (GB) ...................... 1913379

(51) Int. Cl.
| | | |
|---|---|---|
| *F01D 19/00* | (2006.01) | |
| *F01D 9/04* | (2006.01) | |
| *F01D 17/00* | (2006.01) | |
| *F02C 9/26* | (2006.01) | |
| *F01D 17/14* | (2006.01) | |

(52) U.S. Cl.
CPC .............. *F01D 19/00* (2013.01); *F01D 9/041* (2013.01); *F01D 9/045* (2013.01); *F01D 17/00* (2013.01); *F01D 17/14* (2013.01); *F02C 9/26* (2013.01); *F05D 2230/90* (2013.01); *F05D 2240/12* (2013.01); *F05D 2240/80* (2013.01); *F05D 2260/85* (2013.01)

(58) Field of Classification Search
CPC .......... F01D 19/00; F01D 9/041; F01D 9/045; F01D 17/00; F01D 17/14; F01D 5/142; F01D 5/28; F02C 9/26; F05D 2230/90; F05D 2240/12; F05D 2240/80; F05D 2260/85; F05D 2300/1612; F05D 2300/1614; F05D 2300/17; Y02T 50/60
See application file for complete search history.

(56) References Cited

U.S. PATENT DOCUMENTS

| | | | |
|---|---|---|---|
| 2012/0099978 A1* | 4/2012 | Beyer | ..................... F01D 5/286 415/197 |
| 2016/0348519 A1* | 12/2016 | Whitman | ................ F01D 9/041 |
| 2017/0226860 A1 | 8/2017 | Aschermann et al. | |

FOREIGN PATENT DOCUMENTS

| | | |
|---|---|---|
| EP | 2230381 A2 | 9/2010 |
| EP | 2778343 A1 | 9/2014 |
| WO | 2013186756 A1 | 12/2013 |

OTHER PUBLICATIONS

Great Britain search report dated Mar. 11, 2020, issued in GB Patent Application No. 1913379.2.
European Search Report dated Jan. 26, 2021, issued in EP Patent Application 20192299.

\* cited by examiner

*Primary Examiner* — Jacob M Amick
*Assistant Examiner* — Charles J Brauch

(57) ABSTRACT

A gas turbine engine comprising: a combustor configured to initiate combustion; and a turbine comprising a stator vane ring defining a plurality of passageways between adjacent vanes; wherein at least one of the passageways is provided with a restrictor which defines a temporary gas washed surface for the stator vane ring and is configured to be ablated upon initiation of combustion to reveal an operational gas washed surface of the stator vane ring. A method of starting a gas turbine engine is also described.

18 Claims, 8 Drawing Sheets

GAS TURBINE ENGINE

CROSS-REFERENCE TO RELATED APPLICATIONS

This specification is based upon and claims the benefit of priority from United Kingdom patent application number GB 1913379.2 filed on Sep. 17 2019, the entire contents of which is incorporated herein by reference.

BACKGROUND

Technical Field

The present disclosure relates to a gas turbine engine and a method of starting a gas turbine engine.

Description of the Related Art

For some applications, it is a requirement of aircraft gas turbine engines to be started at a variety of in-flight conditions, including at altitude. There can be issues associated with starting such an engine at altitude. In particular, it can be difficult to achieve ignition of fuel within the combustor at altitude. In order to achieve ignition of the fuel, the combustor loading must be sufficiently low. Combustor loading is a parameter used to indicate the stability of combustion based on mass flow rate, pressure and combustor volume. Combustor loading can be reduced by increasing the combustor volume. At altitude, the air pressure is relatively low, therefore the combustor volume needs to be high to achieve a sufficiently low combustor loading to be able to achieve ignition. However, increasing the combustor volume is undesirable as it results in a significant increase in the size and weight of the engine, leading to further fuel and material cost.

There is therefore a need to develop a gas turbine engine that alleviates at least some of the aforementioned problems or at least to provide a useful alternative.

SUMMARY

According to a first aspect, there is provided a gas turbine engine comprising: a combustor configured to initiate combustion; and a turbine comprising a stator vane ring defining a plurality of passageways between adjacent vanes; wherein at least one of the passageways is provided with a restrictor which defines a temporary gas washed surface for the stator vane ring and is configured to be ablated upon initiation of combustion to reveal an operational gas washed surface of the stator vane ring.

Ablation includes, but is not limited to, the following: erosion, vaporisation, chipping, burning, and melting.

It may be that the passageway comprises circumferentially extending endwalls between adjacent vanes. The restrictor may be provided on an operational gas washed surface of the endwalls.

The restrictor may be provided on the operational gas washed surface of a vane delimiting the passageway.

The restrictor may be a coating provided on the endwalls. The coating may at least partially cover an operational gas washed surface of the endwalls.

The restrictor may be a coating provided on a vane delimiting the passageway. The coating may at least partially cover the operational gas washed surface of the respective vane. The coating may completely cover the operational gas washed surface of the respective vane.

The coating may be formed from tin or an alloy of lead and tin.

The restrictor may be an insert configured to cooperate with the stator vane to prevent downstream ejection prior to ablation. It may be that each passageway narrows from an inlet to an outlet. It may be that the insert is configured to be received in the inlet and that the outlet is configured to prevent ejection of the insert prior to ablation. The insert may be formed from a paper-based material or a card-based material.

The passageway may define an operational flow area. The restrictor may be configured to restrict the operational flow area by at least 50% of the operational flow area.

It may be that the restrictor is configured to commence ablation when the combustor exit temperature is from 200° C. to 600° C.

According to a second aspect, there is provided a method of starting a gas turbine engine, the method comprising the steps of: providing a gas turbine engine comprising a combustor configured to initiate combustion and a turbine comprising a stator vane ring defining a plurality of passageways between adjacent vanes; providing at least one of the passageways with a restrictor defining a temporary gas washed surface for the stator vane ring; and initiating combustion in the combustor to increase the temperature of flow exiting the combustor and thereby ablating the restrictor to reveal an operational gas washed surface of the stator vane ring.

The restrictor may be a coating. It may be that providing at least one of the passageways with the restrictor comprises applying the coating to an operational gas washed surface of the stator vane ring. The coating may be applied by spraying or painting.

The restrictor may be an insert. It may be that providing at least one of the passageways with the restrictor comprises installing the insert in the stator vane ring to cover an operational gas washed surface of the stator vane ring. The insert may be formed from a paper-based material or a card-based material.

The restrictor may be provided on an operational gas washed surface of a vane delimiting the passageway.

The restrictor may be provided on an operational gas washed surface of an endwall, the endwall circumferentially extending between adjacent vanes.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
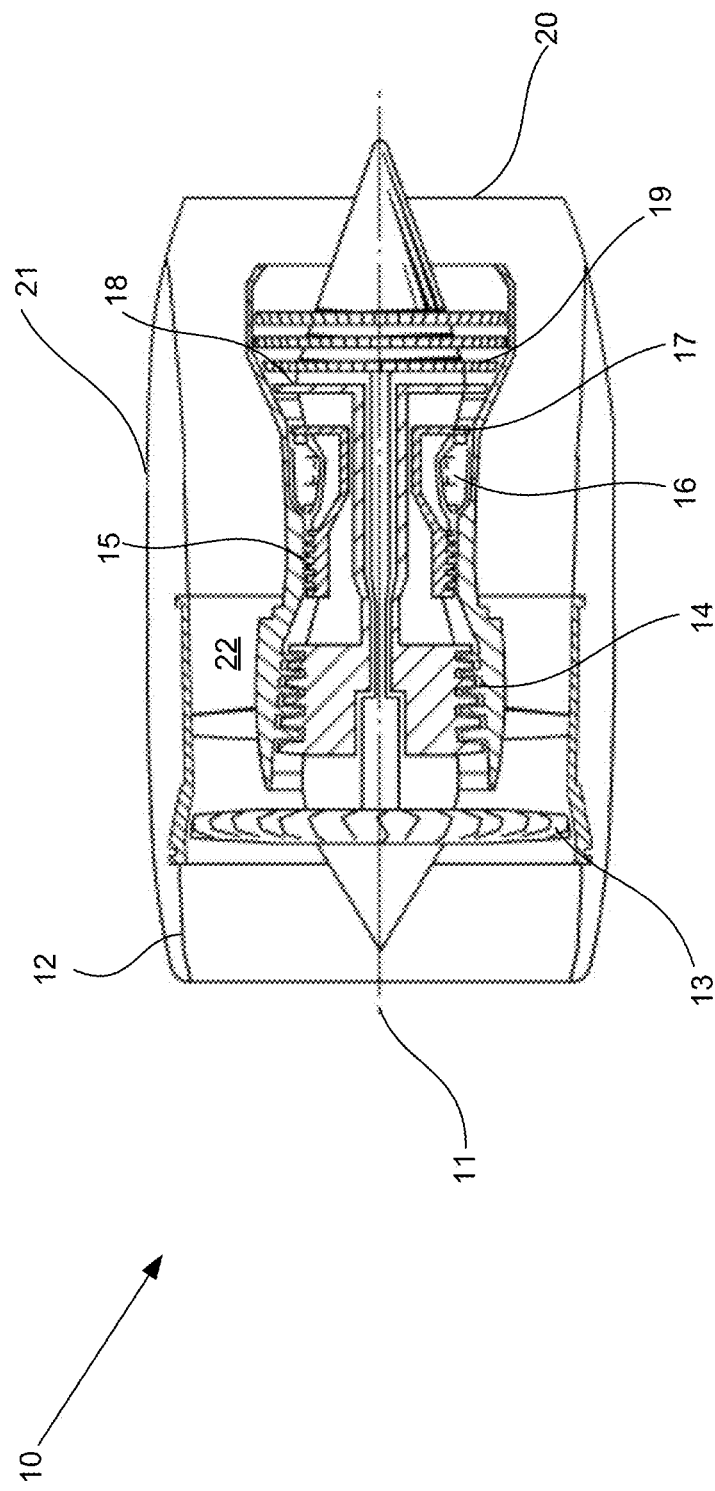
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, a combustor 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first airflow into the intermediate pressure compressor 14 and a second airflow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustor 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Figure 2:
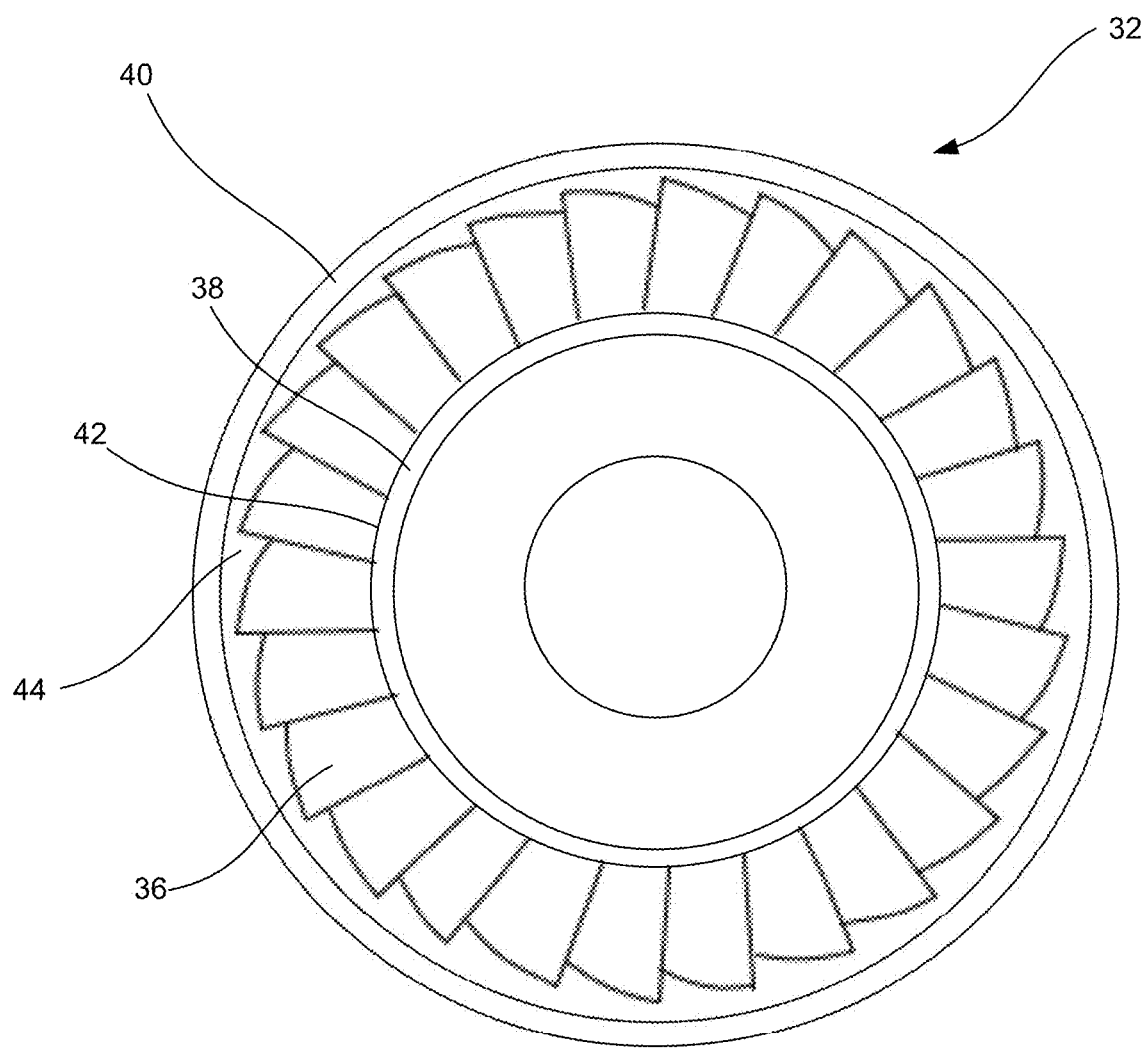
FIG. 2 is a front view of a known stator vane ring.

The high pressure turbine 17 comprises a stator vane ring 32 (FIG. 2) and a rotor ring 34 (FIG. 3), downstream of the stator vane ring 32. FIG. 2 shows a known example stator vane ring 32. The stator vane ring 32 comprises a plurality of vanes 36 circumferentially mounted around a central axis. In this example, the vanes 36 are mounted between an inner ring 38 and an outer ring 40 of the stator vane ring 32. The radially outer surface of the inner ring 38 defines an inner endwall 42. The radially inner surface of the outer ring 40 defines an outer endwall 44.

There is a plurality of passageways 50 between adjacent vanes 36 in the stator vane ring 32. Each passageway 50 is delimited by the adjacent vanes 36, the inner endwall 42 and the outer endwall 44. The passageways 50 allow flow exiting the combustor 16, to flow downstream through the stator vane ring 32 to the rotor ring 34. The rotor ring 34 comprises a plurality of turbine blades 48 configured to rotate around the central axis.

Figure 3:
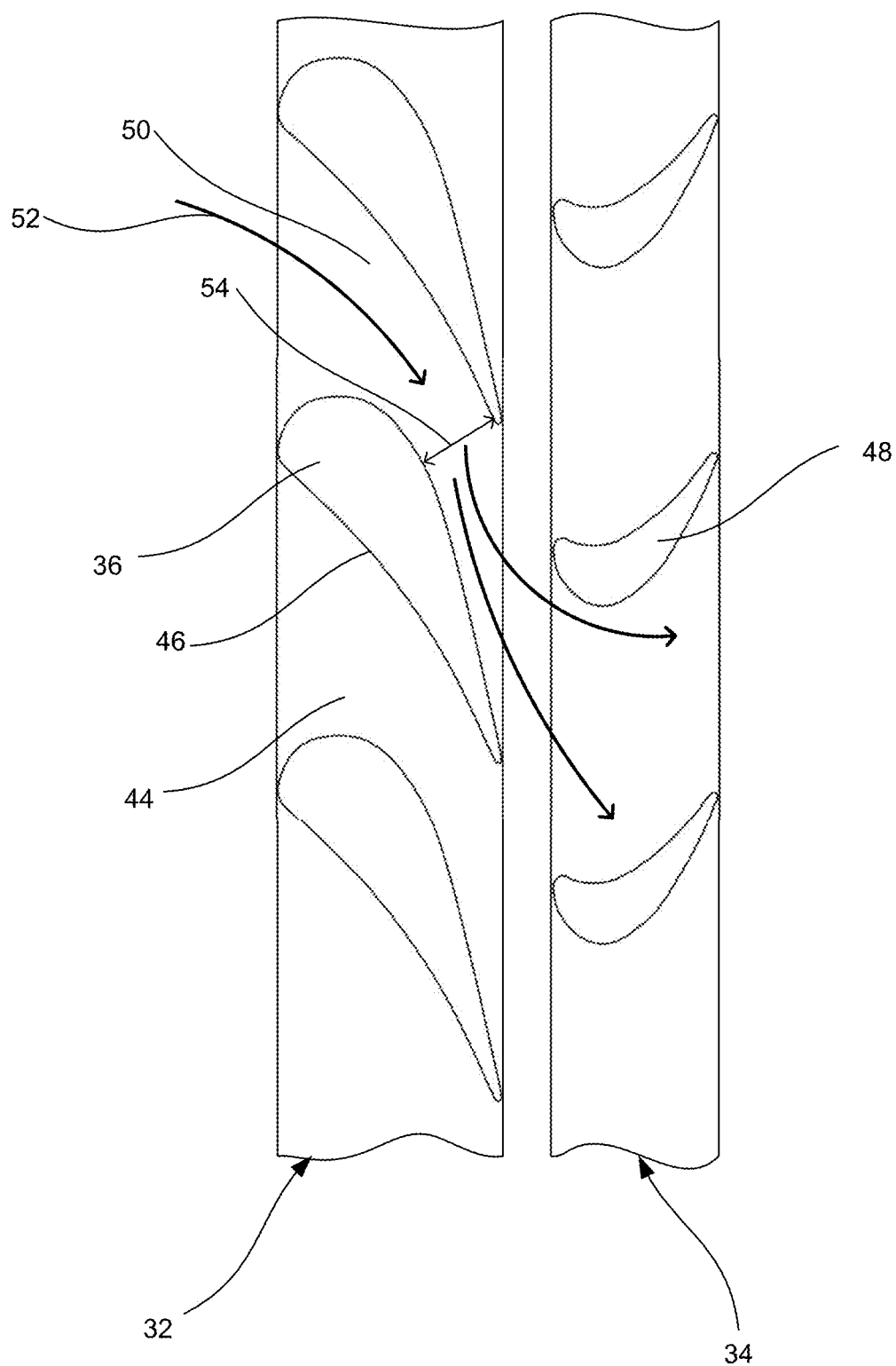
FIG. 3 shows a turbine stage of a known gas turbine engine.

FIG. 3 shows a portion of an axisymmetric cross-section of a high pressure turbine stage of a known gas turbine engine. The turbine stage includes a stator vane ring 32 and a rotor ring 34. Each vane 36 has a complex aerofoil profile and is shaped to swirl the gas flow from the combustor 16 in the direction of rotation of the rotor ring 34. The passageway 50 comprises operational gas washed surfaces over which gas flows during operation of the gas turbine engine. The pressure and suction surfaces of each vane 36 provide operational gas washed surfaces 46, with each passageway 50 being delimited by a pressure surface of one vane 36 and a suction surface of an adjacent vane. Corresponding portions of the inner endwall 42 and the outer endwall 44 are also operational gas washed surfaces of the respective passageway.

Each passageway 50 between adjacent vanes 36 has an operational flow area 54, which herein is defined as the minimum cross-sectional area of the passageway 50. The operational flow area 54 affects the mass flow rate of gas flowing through the passageway 50, and hence the stator vane ring 32.

As discussed above, in order to initiate combustion, the combustor loading must be sufficiently low. Combustor loading is a parameter corresponding to the stability of combustion based on mass flow rate, pressure and combustor volume. The mass flow rate through the combustor 16 is affected by the operational flow area 54 of the passageways 50 of the stator vane ring 32 of the high pressure turbine 17, directly downstream of the combustor 16. Prior to initiation of combustion in the combustor 16, cold air flows through the passageways 50 in the stator vane ring 32 to the rotor ring 34. Once conditions for combustion have been achieved, fuel and air combust in the combustor 16, after which hot gases 52 are produced and flow through the passageways 50 in the stator vane ring 32, driving the high pressure turbine 17.

Figure 4:
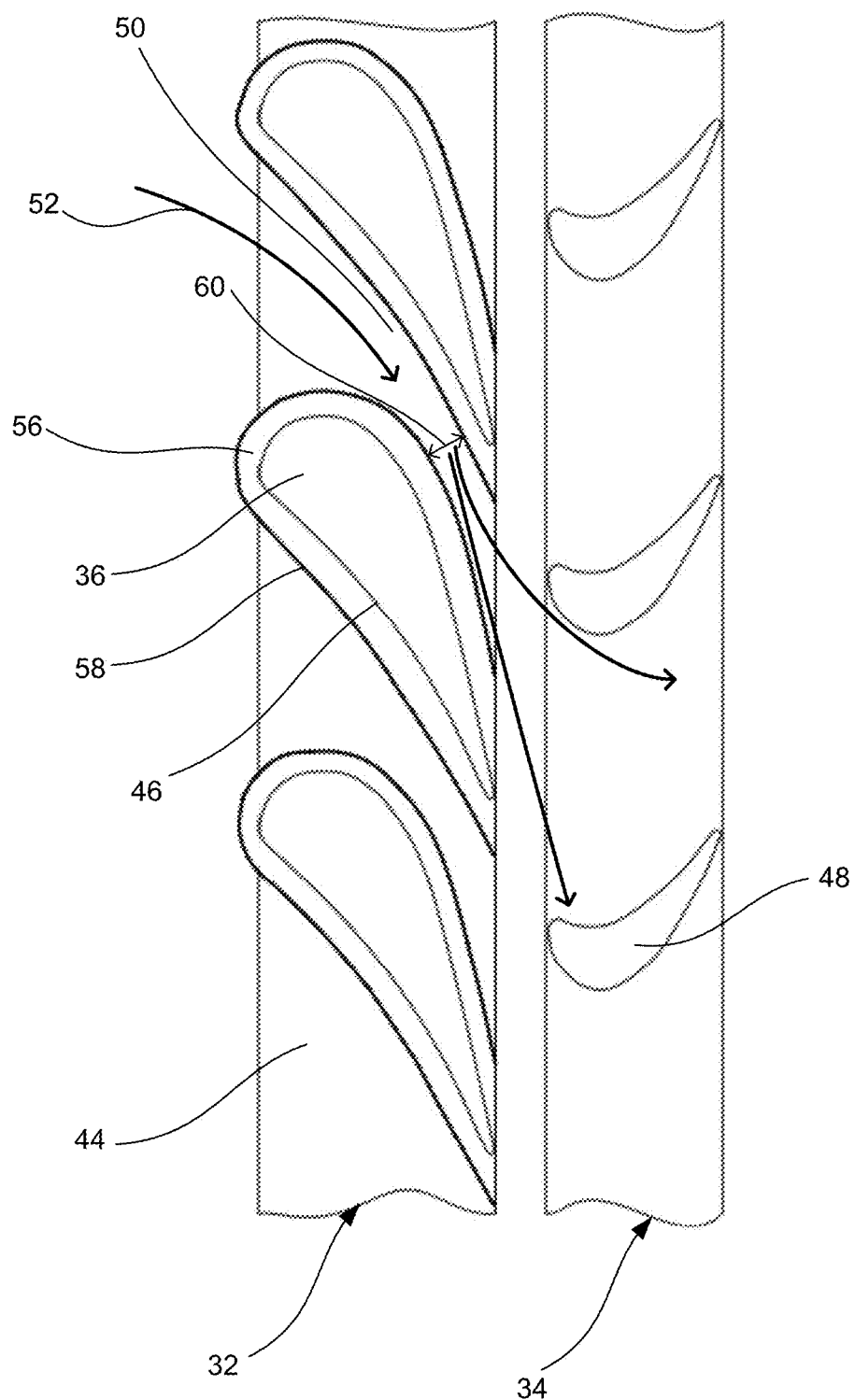
FIG. 4 shows a turbine stage according to a first example gas turbine engine.

FIG. 4 shows an axisymmetric sectional view of a high pressure turbine stage of a first example gas turbine engine. This turbine stage comprises similar features to the turbine stage described with respect to FIGS. 2 and 3, with like reference numerals denoting like features.

As described above, each passageway 50 is delimited by operational gas washed surfaces of the respective adjacent vanes 36, and respective portions of the inner endwall 42 and the outer endwall 44.

The operational gas washed surfaces are those over which gas flows whilst the gas turbine engine is in normal operation following ignition.

As shown in FIG. 4, there is a restrictor 56 provided on the vane 36. In this particular example, a restrictor 56 is provided on each vane 36 of the stator vane ring 32. In other examples, a restrictor 56 may only be provided on some of the vanes 36 of the stator vane ring, or may be installed in the passageway between adjacent vanes. The restrictor 56 is provided on the operational gas washed surface 46 of the vane 36. In this example, the restrictor 56 completely covers the operational gas washed surface 46 of the vane 36 so as to extend over both the pressure surface and the suction surface of the vane. In variants of this example, the restrictor 56 may only cover part of the operational gas washed surface 46, for example over a limited spanwise portion of the vane, over a limited chordwise portion or the vane, on pressure surface only, or on the suction surface only. For example, a restrictor may only be provided on the operational gas washed surface 46 of the vane 36 in a downstream region of the passageway 50 proximal to the rotor ring 34, for example from 50% of the chord of the vane to the trailing edge. The restrictor provides a temporary gas washed surface 58 for the vane 36.

As discussed previously with reference to FIG. 3, each passageway 50 has an operational flow area 54, defined as the minimum cross sectional area of the passageway 50—the "throat"—(which will generally be in a plane perpendicular to the direction of flow through the passageway 50), between the operational gas washed surfaces, which will generally be towards the downstream end of the passageway where adjacent vanes taper towards each other. By providing a restrictor 56 on adjacent vanes 36, the effective operational flow area 54 is reduced and a temporary flow area 60 is defined. In examples, the restrictor 56 is configured to reduce the operational flow area 54 by at least 50% of the operational flow area 54.

Figure 5:
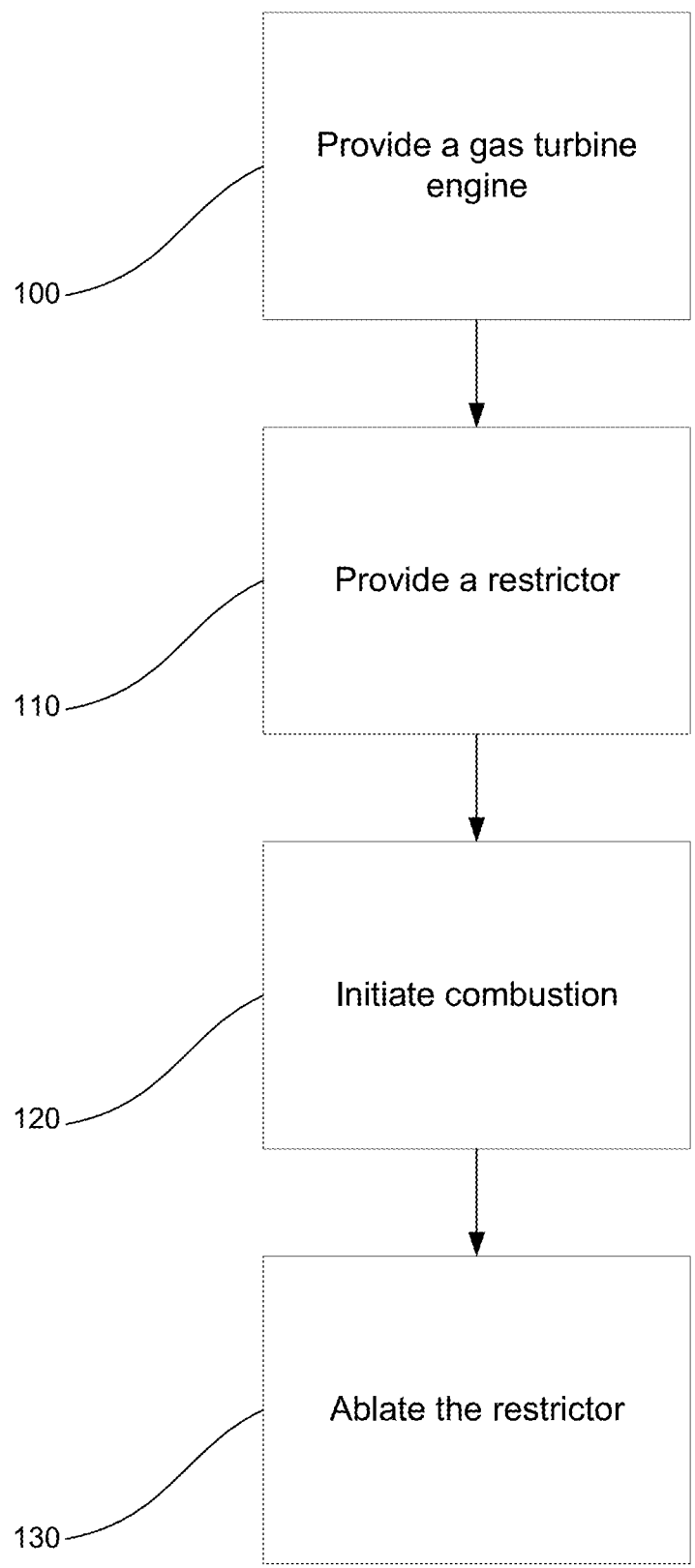
FIG. 5 is a flowchart showing a method of starting the gas turbine engine of FIG. 4.

An example method of starting the gas turbine engine will now be described with respect to FIG. 5 and with reference to the turbine stage described about with respect to FIG. 4. In block 100, a gas turbine engine is provided comprising a combustor 16 configured to initiate combustion and a stator vane ring 32 defining a plurality of passageways 50 between adjacent vanes 36.

In block 110, a restrictor 56 is provided on an operational gas washed surface 46 of a vane 36, the restrictor 56 defining a temporary gas washed surface 58 of the vane 36. The restrictor 56 may be applied to the vane 36 during assembly of the gas turbine engine. Subsequently, the compressor is accelerated by a starting mechanism, for example an auxiliary power unit or starter motor. The compressor drives a flow of cold (ambient) air through the engine. Cold air also flows through the stator vane ring 32, with air flowing over the temporary gas washed surfaces 58 of the vanes 36. As the restrictor 56 provides a reduction in the operational flow area 54 through the stator vane ring 32, the mass flow rate of the air through the stator vane ring 32 is reduced relative to a configuration of the engine without the restrictor 56. The combustor loading is therefore reduced as a result, compared to a configuration of the engine without the restrictor.

With reference to block 120, the combustor loading is sufficiently low to enable combustion to be initiated in the combustor 16. The combustor loading may be sufficiently low with a lower mass flow rate through the combustor 16 than compared with a configuration of the engine without the restrictor 56. A fuel-air mixture is ignited in the combustor 16 and hot gases exit the combustor 16. Once ignition has been achieved, the turbine begins to drive the compressor such that a higher compression ratio and combustor exit temperatures are achieved.

The restrictor 56 is configured to be ablated from the vanes 36 once combustion has been initiated, such that ablation commences following initiation of combustion (block 130). Ablation may take place once the temperature of the flow of hot gases 52 exiting the combustor 16 reaches a threshold temperature. For example, the threshold temperature may be from 200° C. to 600° C. The restrictor 56 may ablate away gradually as the temperature of the hot gases 52 increases.

As the restrictor 56 has been ablated from the vane 36, the temporary gas washed surface 58 is removed to reveal the operational gas washed surface 46 of the vane 36. The passageway 50 therefore regains the original operational flow area 54, allowing a greater mass flow rate through the stator vane ring 32 and consequently allowing the engine to sustain combustion and operate at design (e.g. cruise) conditions.

The restrictor 56 is provided as a coating on the operational gas washed surface 46 of the vane 36. The coating can be applied to the vane 36 during assembly of the gas turbine engine. The coating may be applied to the vane 36 using spraying or painting. The coating may be formed from a metallic material, in particular a soft metal, such as tin or an alloy of lead and tin. During ablation of the coating, the metal may melt when the temperature of the hot gases 52 exiting the combustor 16 reaches a threshold temperature, which may be from 200° C. to 600° C.

Alternatively, a restrictor can be provided as an insert which covers the operational gas washed surface 46 of one or more vanes 36. Such an insert may be placed within the passageway 50 during assembly of the gas turbine. Each passageway 50 has an inlet and an outlet, with the passageway generally narrowing from the inlet to the outlet. During assembly, the insert may be inserted into the passageway 50 through the inlet (i.e. from the upstream side of the stator vane ring). Due to the narrowing of the passageway 50, the insert may be retained in the outlet such that it is prevented from passing through the outlet. The insert may be configured to cooperate with the vane 36 and/or the outlet of the passageway 50 in order to prevent the insert from being ejected from the passageway 50 in a downstream direction when cold air is initially flowing through the engine during start-up. The insert may be fixed to the vane 36 or stator vane ring 32 using adhesive or using interlocking elements which cooperate with the vane 36 or outlet of the passageway 50. The insert may be formed from a material which is significantly weaker than the material of the stator vane ring, for example, the insert may be formed from a paper-based or card-based material. During ablation of the insert, the material may combust when the temperature of the hot gases 52 exiting the combustor reaches a threshold temperature, which may be from 200° C. to 600° C. Any material having properties that promote ablation in the relevant conditions can be used, for example a coating or insert as disclosed herein may be formed from a plastics material or a wood-based material.

Figure 6:
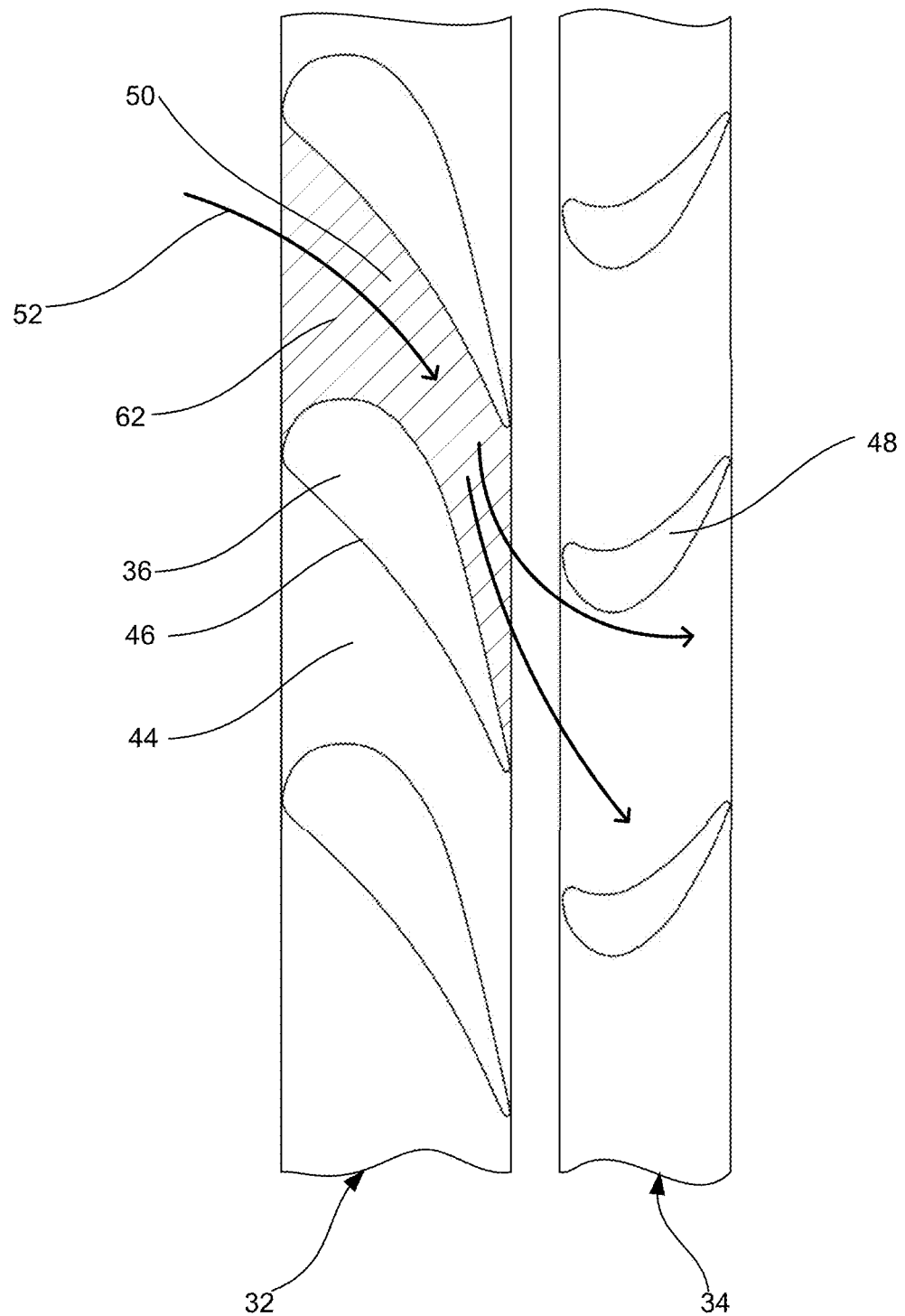
FIG. 6 shows a turbine stage according to a second example gas turbine engine.

FIG. 6 shows an axisymmetric sectional view of a high pressure turbine stage of a second example gas turbine according to the present disclosure. This example comprises similar features to that of the first example as previously described, with like reference numerals indicating like features. It differs from the embodiment of FIG. 4 with respect to the form of the restrictor.

As described above, each passageway 50 is delimited by operational gas washed surfaces of the respective adjacent vanes 36, and respective portions of the inner endwall 42 and the outer endwall 44. The operational gas washed surfaces are those over which gas flows whilst the gas turbine engine is in normal operation following ignition.

In this example, there are restrictors 62 provided on the inner and outer endwalls 42, 44 delimiting the passageway 50. In other examples, a restrictor 62 may be provided on only one of the inner and outer endwalls 42, 44. A restrictor 62 may only be provided on the inner and outer endwalls 42, 44 of some of the passageways 50 in the stator vane ring 32. In other examples, restrictors 62 may be provided on the inner and outer endwalls 42, 44 of all the passageways 50 in the stator vane ring 32. In the illustrated example, the restrictors 62 completely cover the operational gas washed surface of the inner and outer endwalls 42, 44, but in other examples, a restrictor 62 may only cover part of the operational gas washed surface. In examples, the restrictor 62 may only be provided on the operational gas washed surface of the passageway 50 in a region of the passageway proximal to the rotor ring 34, that is to say a downstream chord-wise portion of the passageway. The restrictor provides a temporary gas washed surface 66 for the inner and outer endwalls 42, 44.

Figure 7:
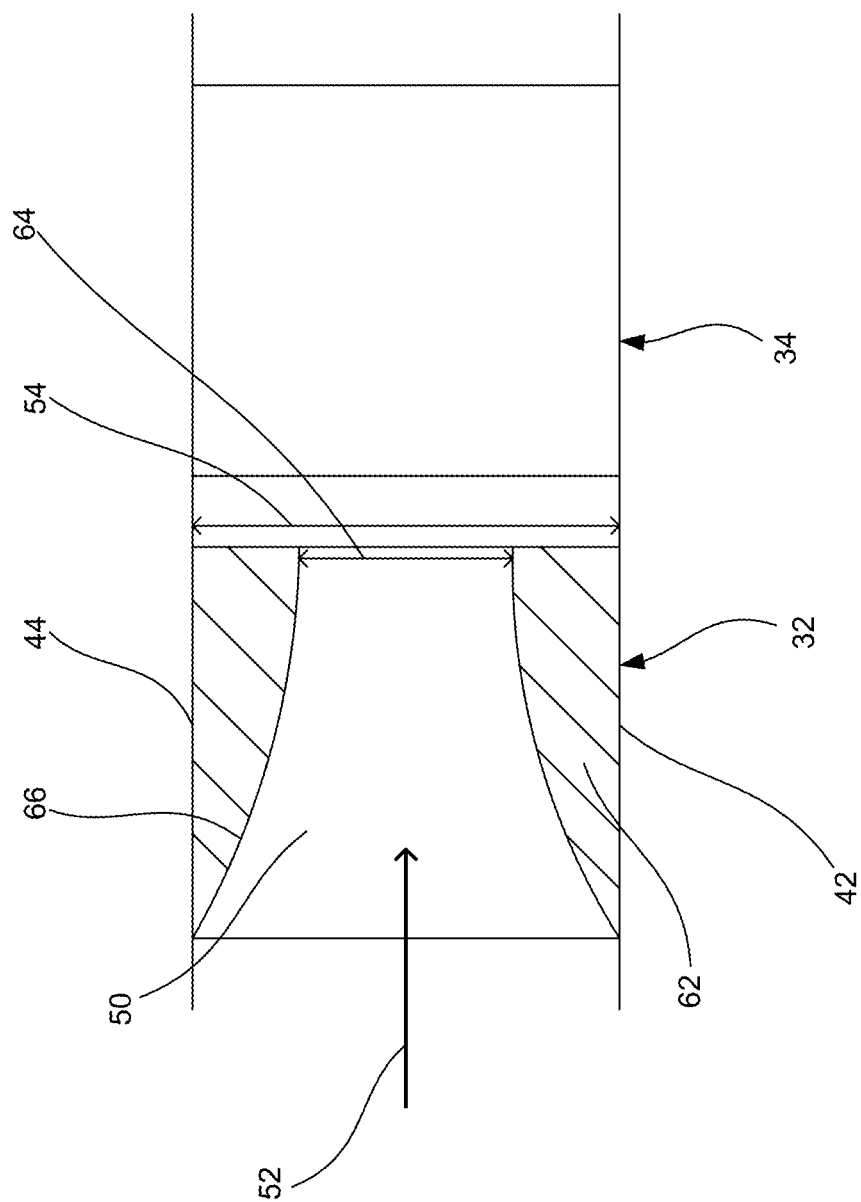
FIG. 7 is a side view of the turbine stage according to FIG. 6.

FIG. 7 shows a sectional view of the high pressure turbine stage in a plane intersecting the principal rotational axis of the engine and which intersects a passageway 50 provided with a restrictor 62. As discussed previously, with reference to FIG. 3, each passageway 50 has an operational flow area 54, defined as the minimum cross-sectional area of the passageway 50 during normal operation of the gas turbine engine after starting. By providing restrictors 62 on the inner and outer endwalls 42, 44 of the passageway 50, the effective operational flow area 54 is reduced to a temporary flow area 64. The restrictor 62 may be configured to reduce the operational flow area 54 by at least 50% of the operational flow area 54.

The restrictor 62 is shaped to reduce the flow area from a maximum at the inlet of the passageway to a minimum at the outlet of the passageway 50. The restrictor 62 may also have profile configured to achieve a smooth flow or air and/or gas across the temporary gas washed surface 66 provided by the restrictor 62 (which may be referred to as an "aerodynamic profile"). The restrictor 62 is also shaped to ensure that air 52 flowing through the stator vane ring 32 has a whirl as it exits the stator vane ring 32 and enters the rotor ring 34 in substantially the same direction as would be the case in a configuration without the restrictor 62 being provided in the passageway 50. The whirl is defined as the angle of the flow exiting the stator vane ring 32, relative to the axial centreline of the engine.

Figure 8:
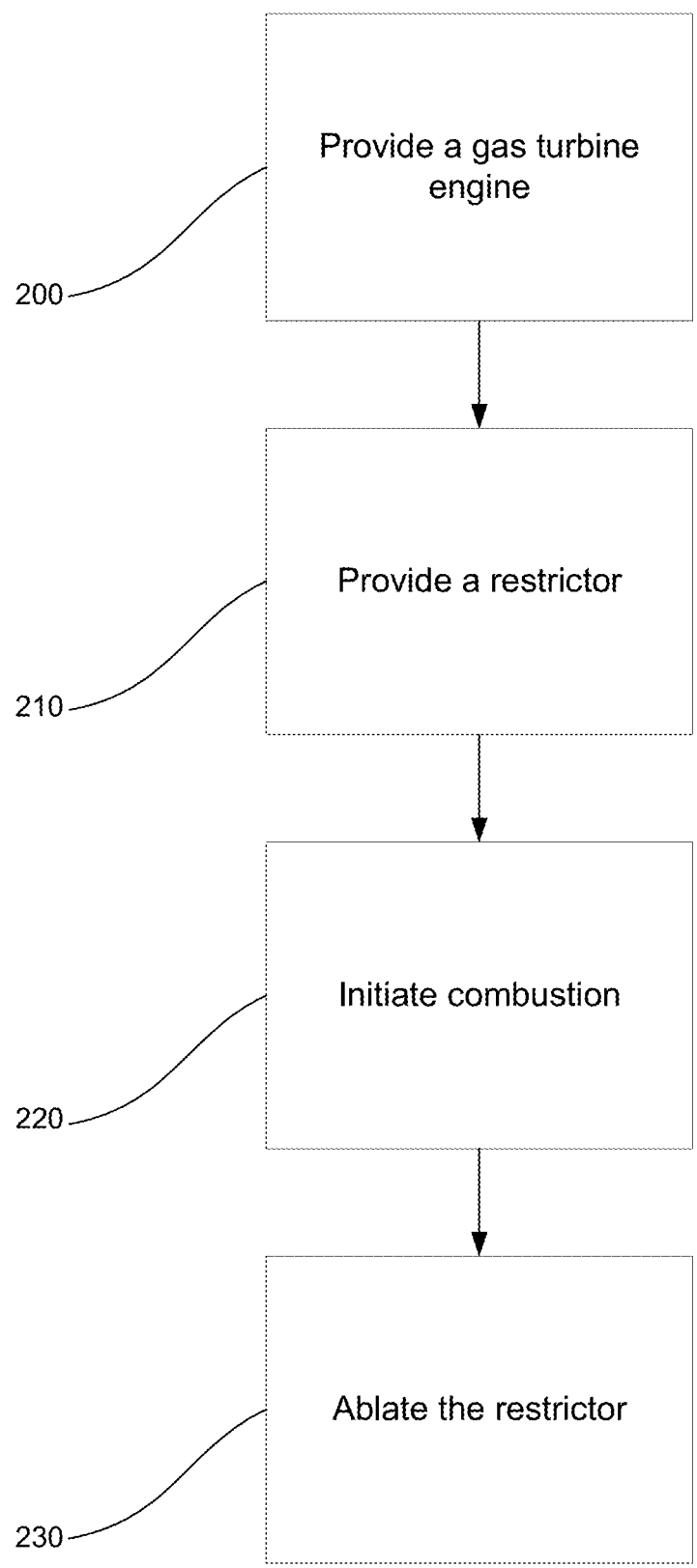
FIG. 8 is a flowchart showing a method of starting the gas turbine engine of FIGS. 6 and 7.

An example method of starting the gas turbine engine will now be described with respect to FIG. 8 and with reference to the turbine stage described about with respect to FIGS. 6 and 7.

In block 200, a gas turbine engine is provided comprising a combustor 16 configured to initiate combustion and a stator vane ring 32 defining a plurality of passageways 50 between adjacent vanes 36.

In block 210, a restrictor 62 is provided on an operational gas washed surface of an endwall 42, 44, the restrictor 62 defining a temporary gas washed surface 66 of the endwall 42, 44 as described above with respect to FIGS. 6 and 7. The restrictor 62 may be provided on both the inner and outer endwalls 42, 44. The restrictor 62 may be applied to the endwalls 42, 44 during assembly of the gas turbine engine. Subsequently, the compressor is accelerated by a starting mechanism, for example an auxiliary power unit or starter motor. The compressor drives a flow of cold (ambient) air 52 through the engine. Cold air also flows through the stator vane ring 32, with air flowing over the temporary gas washed surfaces 66 of the inner and outer endwalls 42, 44. As the restrictor 62 provides a reduction in the operational flow area 54 through the stator vane ring 32, the mass flow rate of the air through the stator vane ring 32 is reduced relative to a configuration of the engine without the restrictor 62. The combustor loading is therefore reduced as a result compared to a configuration of the engine without the restrictor 62.

With reference to block 220, the combustor loading is sufficiently low to enable combustion to be initiated in the combustor 16. The combustor loading may be sufficiently low with a lower mass flow rate through the combustor 16 than compared with a configuration of the engine without the restrictor 62. A fuel-air mixture is ignited in the combustor 16 and hot gases 52 exit the combustor 16. Once ignition has been achieved, the turbine begins to drive the compressor such that a higher compression ratio and combustor exit temperatures are achieved.

The restrictor 62 is configured to be ablated from the inner and outer endwalls 42, 44, once combustion has been initiated, such that ablation commences following initiation of combustion (block 230). Ablation may take place once the temperature of the flow of hot gases 52 exiting the combustor reaches a threshold temperature. For example, the threshold temperature may be from 200° C. to 600° C. The restrictor 62 may ablate away gradually as the temperature of the hot gases 52 increases.

As the restrictor 62 has been ablated from the inner and outer endwalls 42, 44, the temporary gas washed surfaces 66 are removed to reveal the operational gas washed surfaces of the inner and outer endwalls 42, 44. The passageway 50 therefore regains the operational flow area 54, allowing a greater mass flow rate through the stator vane ring 32 and consequently allowing the engine to sustain combustion and operate at design (e.g. cruise) conditions.

The restrictor 62 is provided as an insert which covers the operational gas washed surface of the inner and outer endwalls 42, 44. Such an insert may be placed within the passageway 50 during assembly of the gas turbine engine. Each passageway 50 has an inlet and an outlet, with the passageway generally narrowing from the inlet to the outlet. During assembly, the insert may be inserted into the passageway 50 through the inlet (i.e. from the upstream side of the stator vane ring). Due to the narrowing of the passageway 50, the insert may be retained in the outlet such that it is prevented from passing through the outlet. The insert may be configured to cooperate with the inner and outer endwalls 42, 44 and/or the vanes 36 and/or the outlet of the passageway 50 in order to prevent the insert from being ejected from the passageway 50 in a downstream direction when cold air is initially flowing through the engine prior to initiation of combustion. The insert may be fixed to the inner and outer endwalls 42, 44 or vanes 36 or stator vane ring 32 using adhesive or using interlocking elements which cooperate with the inner and outer endwalls 42, 44 or vanes 36 or outlet of the passageway 50. The insert may be formed from a material which is significantly weaker than the material of the stator vane ring, for example, the insert may be formed from a paper-based or card-based material. During ablation of the insert, the material may combust when the temperature of the hot gases 52 exiting the combustor 16 reaches a threshold temperature, which may be from 200° C. to 600° C.

Alternatively, the restrictor 62 may be provided as a coating on the operational gas washed surface of the inner and outer endwalls 42, 44. The coating can be applied to the inner and outer endwalls 42, 44 during assembly of the gas turbine engine. The coating may be applied to the inner and outer endwalls 42, 44 using spraying or painting. The coating may be formed from a metallic material, in particular a soft metal, such as tin or an alloy of lead and tin. During ablation of the coating, the metal may melt when the temperature of the hot gases 52 exiting the combustor 16 reaches a threshold temperature, which may be from 200° C. to 600° C. As described previously, any material having properties that promote ablation in the relevant conditions can be used, for example a coating or insert as disclosed herein may be formed from a plastics material or a wood-based material.

Whilst it has been described herein that the restrictor 56, 62 is provided on a stator vane ring 32 of a high pressure turbine of a gas turbine engine, the restrictor 56, 62 could also be provided on a stator vane ring 32 of a low pressure turbine. Additionally, the restrictor 56, 62 may also be provided on a rotor ring 34 of a high pressure turbine or low pressure turbine.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A gas turbine engine comprising:
   a combustor configured to initiate combustion; and
   a turbine comprising a stator vane ring defining a plurality of passageways between adjacent vanes;
   wherein at least one of the passageways is provided with a restrictor which defines a temporary gas washed surface for the stator vane ring and is configured to be ablated upon initiation of combustion to reveal an operational gas washed surface of the stator vane ring; and
   wherein the restrictor is an insert configured to cooperate with the stator vane to prevent downstream ejection of the restrictor prior to ablation.

2. The gas turbine engine of claim 1, wherein the passageway comprises circumferentially extending endwalls between adjacent vanes; and wherein the restrictor is provided on an operational gas washed surface of the endwalls.

3. The gas turbine engine of claim 1, wherein the restrictor is provided on the operational gas washed surface of a vane delimiting the passageway.

4. The gas turbine engine of claim 1, wherein the insert is formed from a paper-based material or a card-based material.

5. The gas turbine engine claim 1, wherein each passageway narrows from an inlet to an outlet, and wherein the insert is configured to be received in the inlet, and wherein the outlet is configured to prevent ejection of the insert prior to ablation.

6. The gas turbine engine of claim 1, wherein the passageway defines an operational flow area, and wherein the restrictor is configured to restrict the operational flow area by at least 50% of the operational flow area.

7. The gas turbine engine of claim 1, wherein the restrictor is configured to commence ablation when the combustor exit temperature is from 200° C. to 600° C.

8. A method of starting a gas turbine engine, the method comprising the steps of:
   providing a gas turbine engine comprising a combustor configured to initiate combustion and a turbine comprising a stator vane ring defining a plurality of passageways between adjacent vanes;
   providing at least one of the passageways with a restrictor defining a temporary gas washed surface for the stator vane ring; and
   initiating combustion in the combustor to increase the temperature of flow exiting the combustor, thereby ablating the restrictor to reveal an operational gas washed surface of the stator vane ring; and
   wherein the restrictor is an insert, and wherein providing at least one of the passageways with the restrictor comprises installing the insert in the stator vane ring to cover an operational pas washed surface of the stator vane ring.

9. The method of claim 8, wherein the restrictor is provided on an operational gas washed surface of a vane delimiting the passageway.

10. The method of claim 8, wherein the restrictor is provided on an operational gas washed surface of an endwall, the endwall circumferentially extending between adjacent vanes.

11. A gas turbine engine comprising:
    a combustor configured to initiate combustion; and
    a turbine comprising a stator vane ring defining a plurality of passageways between adjacent vanes;
    wherein at least one of the passageways is provided with a restrictor which defines a temporary gas washed surface for the stator vane ring and is configured to be ablated upon initiation of combustion to reveal an operational gas washed surface of the stator vane ring; and
    wherein the restrictor is a coating formed from tin or an alloy of lead and tin.

12. The gas turbine engine of claim 11, wherein the passageway comprises circumferentially extending endwalls between adjacent vanes; and wherein the restrictor is provided on an operational gas washed surface of the endwalls.

13. The gas turbine engine of claim 12, wherein the restrictor is a coating provided on the endwalls, and wherein the coating at least partially covers an operational gas washed surface of the endwalls.

14. The gas turbine engine of claim 11, wherein the restrictor is provided on the operational gas washed surface of a vane delimiting the passageway.

15. The gas turbine engine of claim 14, wherein the restrictor is a coating provided on a vane delimiting the passageway and wherein the coating at least partially covers the operational gas washed surface of the respective vane.

16. The gas turbine engine of claim 15, wherein the coating completely covers the operational gas washed surface of the respective vane.

17. The gas turbine engine of claim 11, wherein the passageway defines an operational flow area, and wherein the restrictor is configured to restrict the operational flow area by at least 50% of the operational flow area.

18. The gas turbine engine of claim 11, wherein the restrictor is configured to commence ablation when the combustor exit temperature is from 200° C. to 600° C.

* * * * *